United States Patent
Benitez et al.

(10) Patent No.: US 9,987,968 B2
(45) Date of Patent: Jun. 5, 2018

(54) QUICK RELEASE HOOK DEVICE FOR TRAILERS

(71) Applicant: Hyundai Translead, San Diego, CA (US)

(72) Inventors: Humberto Benitez, San Diego, CA (US); Young Jae Park, San Diego, CA (US); Joel Maldonado Contreras, San Diego, CA (US)

(73) Assignee: HYUNDAI TRANSLEAD, San Diego, CA (US)

( * ) Notice: Subject to any disclaimer, the term of this patent is extended or adjusted under 35 U.S.C. 154(b) by 0 days. days.

(21) Appl. No.: 15/351,204

(22) Filed: Nov. 14, 2016

(65) Prior Publication Data

US 2018/0079349 A1    Mar. 22, 2018

Related U.S. Application Data

(60) Provisional application No. 62/395,982, filed on Sep. 16, 2016.

(51) Int. Cl.
| | | |
|---|---|---|
| *A47B 96/06* | (2006.01) | |
| *B60P 7/08* | (2006.01) | |
| *F16B 45/00* | (2006.01) | |

(52) U.S. Cl.
CPC ............ *B60P 7/0815* (2013.01); *F16B 45/00* (2013.01)

(58) Field of Classification Search
USPC ..................................... 248/213.2
See application file for complete search history.

(56) References Cited

U.S. PATENT DOCUMENTS

| | | | | |
|---|---|---|---|---|
| 5,690,466 A | * | 11/1997 | Gaddis ...................... | B60P 1/40 296/184.1 |
| 9,376,048 B2 | * | 6/2016 | Evans ....................... | B60P 1/00 |
| 9,702,175 B2 | * | 7/2017 | Jaworski ............. | E05D 11/1014 |
| 2008/0012372 A1 | * | 1/2008 | Squyres .................... | B60P 1/00 296/24.44 |
| 2014/0110960 A1 | * | 4/2014 | Gilbert ...................... | B60P 1/00 296/24.44 |
| 2014/0158653 A1 | * | 6/2014 | Evans .................... | E05D 5/0238 211/90.02 |
| 2017/0158107 A1 | * | 6/2017 | Baker ....................... | B60P 1/36 |

\* cited by examiner

*Primary Examiner* — Monica E Millner
(74) *Attorney, Agent, or Firm* — Procopio, Cory, Hargreaves & Savitch LLP

(57) ABSTRACT

A hook device for securing or releasing a deck panel used in a cargo section of a trailer, the hook device including: a guide bracket configured with at least first and second sides, the guide bracket including a groove formed on the first side and extending to the second side; and a hook configured to operate within the groove to secure or release the deck panel, the hook configured to secure the deck panel in a stored position when the hook is on the first side of the guide bracket and to release the deck panel in a work position when the hook is on the second side of the guide bracket.

17 Claims, 8 Drawing Sheets

QUICK RELEASE HOOK DEVICE FOR TRAILERS

CROSS-REFERENCE TO RELATED APPLICATIONS

This application claims the benefit of priority under 35 U.S.C. § 119(e) of U.S. Provisional Patent Application No. 62/395,982, filed Sep. 16, 2016, entitled "Cargo Vehicle with Quick Release Hook." The disclosure of the above-referenced application is incorporated herein by reference.

BACKGROUND

Field of the Invention

The present disclosure relates to a quick-release hook device, and more specifically, to a quick-release hook device for securing and releasing a deck panel used in a cargo section of a trailer and from the side of the cargo section.

Background

A trailer may include a deck system in its cargo section. The deck system may include one of more deck panels including a conveyer deck panel. Each of the deck panels can be moved to a work position or stored position.

SUMMARY

The present disclosure describes a quick-release hook device for securing and releasing the deck panel from the side of the cargo section.

In one embodiment, a hook device for securing or releasing a deck panel used in a cargo section of a trailer is disclosed. The hook device includes: a guide bracket configured with at least first and second sides, the guide bracket including a groove formed on the first side and extending to the second side; and a hook configured to operate within the groove to secure or release the deck panel, the hook configured to secure the deck panel in a stored position when the hook is on the first side of the guide bracket and to release the deck panel in a work position when the hook is on the second side of the guide bracket.

In another embodiment, an apparatus for a cargo section of a trailer is disclosed. The apparatus includes: a bracket coupled to a sidewall of the cargo section, the bracket configured with a plurality of sides; a groove formed on a first side of the plurality of sides and extending into a second side adjacent to the first side, the groove configured along a vertical angle and turning into a slanted angle on the first side of the bracket, and the groove configured to continue in the slanted angle on the second side but substantially perpendicular to the groove on the first side; and a hook disposed within the groove, the hook configured to secure a deck panel when the hook is on the first side of the bracket and to release the deck panel when the hook is on the second side of the bracket.

In yet another embodiment, an apparatus is disclosed. The apparatus includes: means for securing and releasing a deck panel into and from a stored position on a sidewall of a cargo section of a trailer, the means for securing having at least first and second sides; and means for guiding the means for securing along a vertical angle and turning into at least a first slanted angle on the first side, and continuing on the first slanted angle on the second side but substantially perpendicular to the first side.

Other features and advantages of the present disclosure should be apparent from the present description which illustrates, by way of example, aspects of the present disclosure.

BRIEF DESCRIPTION OF THE DRAWINGS

The details of the present disclosure, both as to its structure and operation, may be gleaned in part by study of the appended drawings, in which like reference numerals refer to like parts, and in which.

DETAILED DESCRIPTION

As stated above, a deck panel in the cargo section of a trailer, for example, can be moved to a work position or stored position. However, when the deck panel is moved to the stored position, the panel can fall off that position and cause injury to personnel or damage to the cargo, unless the deck panel is securely locked. Further, when the deck panel is to be moved to the work position, the panel should be easily movable from the stored position to the work position.

Several embodiments of a quick-release hook device for securing and releasing the deck panel from the side of the cargo section are described in the present disclosure. In one embodiment, the quick-release hook device is configured with a hook movably attached to a guide bracket. The hook is moveable between a secured position (which secures the deck panel in the stored position) and a released position (which releases the deck panel from the hook to the work position). The guide bracket guides the hook to swing away from the cargo section as the hook is moved from the secured position to the released position.

After reading this description it will become apparent how to implement the present disclosure in various embodiments and applications. However, although various embodiments of the present disclosure will be described herein, it is understood that these embodiments are presented by way of example only, and not limitation. As such, this detailed description of various embodiments should not be construed to limit the scope or breadth of the present disclosure.

Figure 1A:
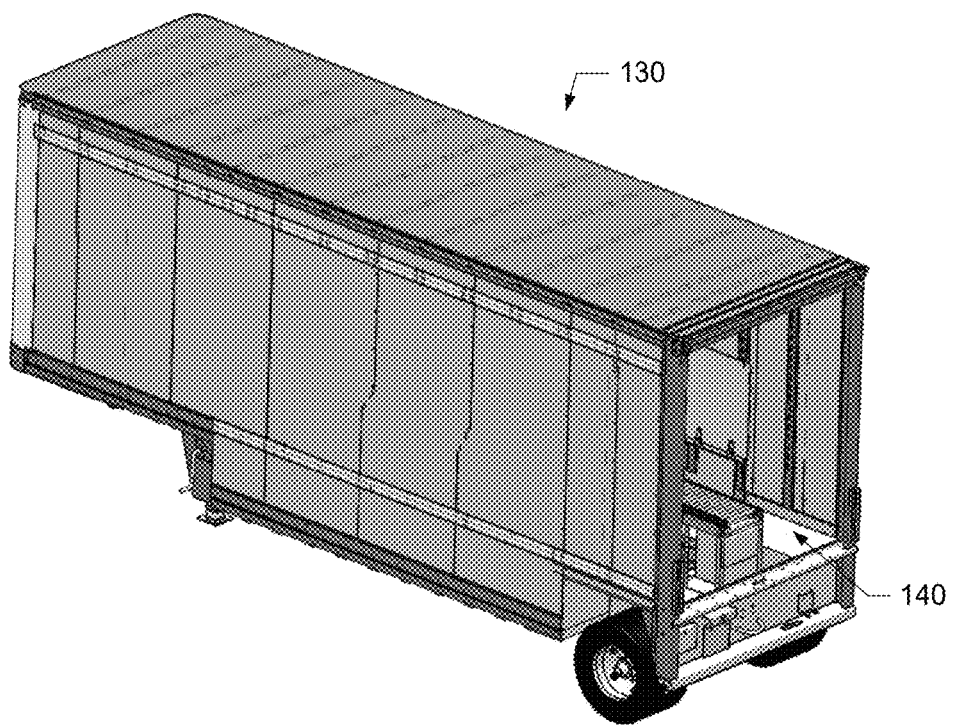
FIG. 1A is a perspective view of a trailer having a cargo section.
Figure 1B:
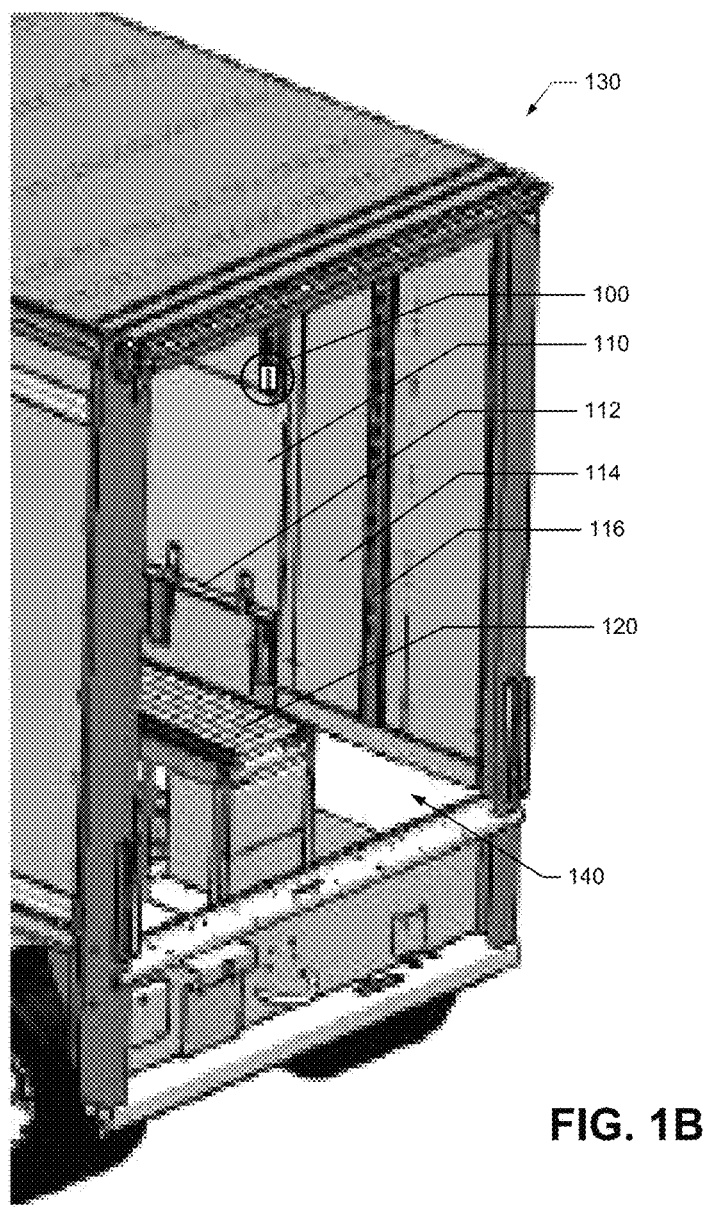
FIG. 1B is a detailed view of the cargo section shown in FIG. 1A and including a quick-release hook device.

FIG. 1A is a perspective view of a trailer 130 having a cargo section 140 in accordance with one embodiment of the present disclosure. FIG. 1B is a detailed view of the cargo section 140 shown in FIG. 1A and including a quick-release hook device 100.

In the illustrated embodiment of FIG. 1B, the cargo section 140 also includes at least one deck panel 110 and a conveyor panel 120. Although the deck panels 110 are shown on one side of the cargo section only, deck panels can also be configured on the other side as well. The deck panels 110 are configured to provide an additional surface on which the cargo can be stowed. The conveyor panel 120 includes rollers to easily move the cargo in and out of the cargo section 140.

In the illustrated embodiment of FIG. 1F, the cargo section 140 also includes side rails 112 coupled to the inner surface 114. In one embodiment, the deck panels 110 are coupled to the side rails 112 and can be moved between the work position and the stored position. In another embodiment, the deck panels 110 are coupled to the inner surface 114 (or the wall) directly. The cargo section 140 further includes at least one vertical post 116 coupled to the inner surface 114 of the cargo section 140.

In one embodiment, each of the deck panels 110 couples to the quick-release hook device 100 which is configured with a hook movably attached to a guide bracket. The hook is moveable between a secured position and a released position. FIG. 1B shows the quick-release hook 100 in a secured position which secures the deck panel 110 in the stored position. The guide bracket guides the hook to swing away from the cargo section as the hook is moved from the secured position to the released position.

Figure 2:
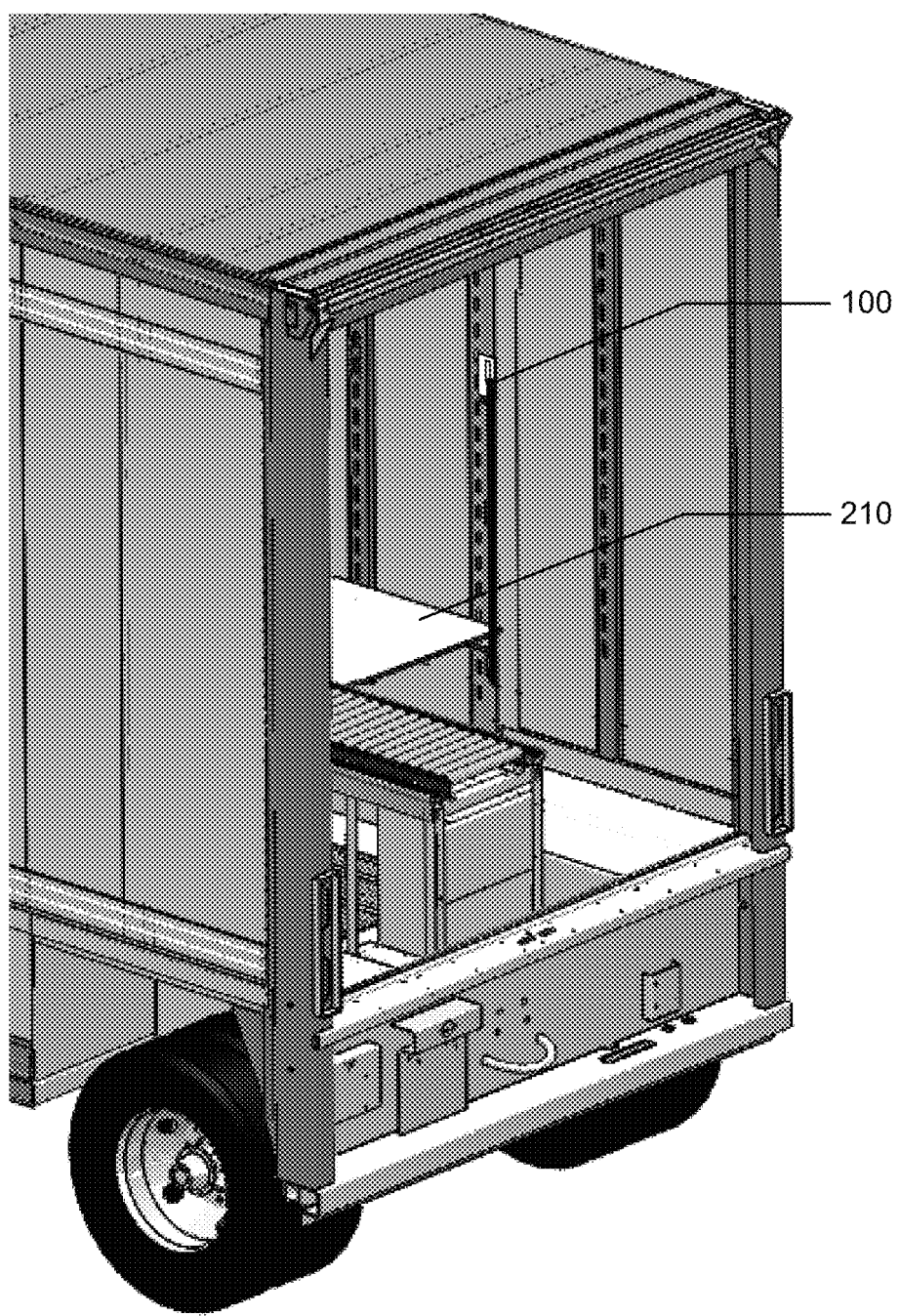
FIG. 2 is a detailed view of the cargo section showing the quick-release hook in a released position.

FIG. 2 is a detailed view of the cargo section 140 showing the quick-release hook 100 in a released position in accordance with one embodiment of the present disclosure. Thus, moving the quick-release hook 100 to the released position releases the deck panels 210 from the hook 100 and the deck panels 210 are lowered into the work position.

When the deck panels 210 are in the work position, the deck panels provide an additional surface on which the cargo can be placed and/or moved in and out of the cargo section. When the deck panels 210 are in the stored position, the cargo section can be configured differently to store the cargo differently or keep the cargo section empty.

Figure 3:
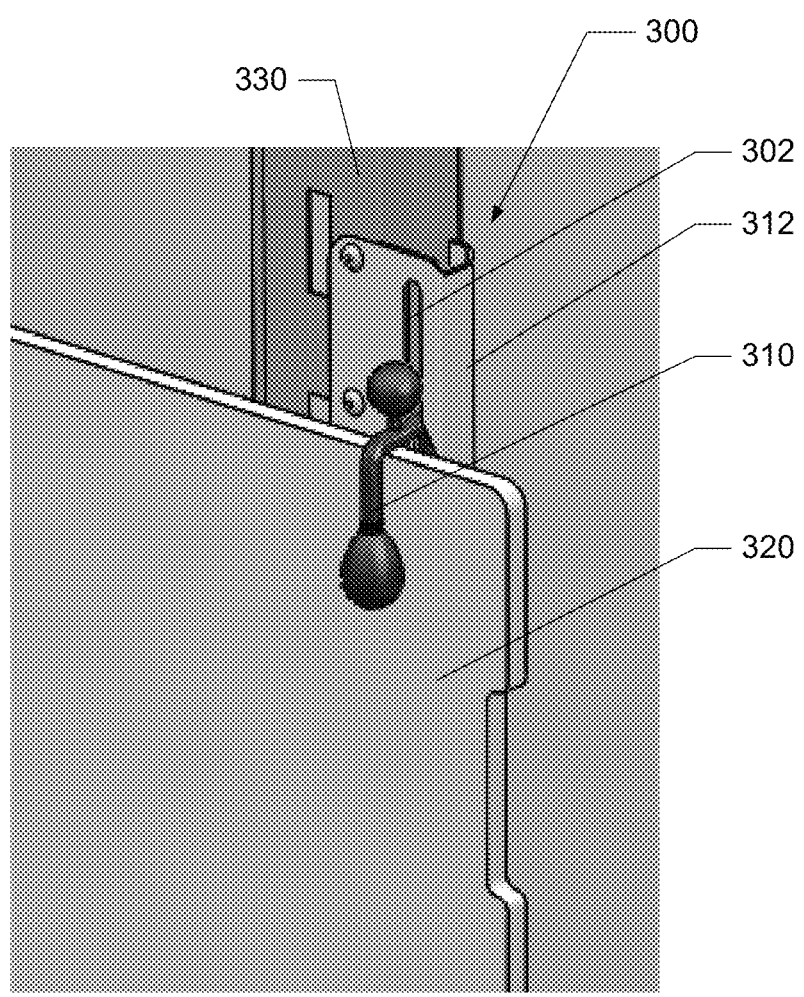
FIG. 3 is a detailed view or a quick-release hook device.

FIG. 3 is a detailed view of a quick-release hook device 300 in accordance with one embodiment of the present disclosure. In the illustrated embodiment of FIG. 3, the quick-release hook device 300 is attached to the vertical post 330 and is configured with a hook 310 movably attached to a guide bracket 312. The configuration of FIG. 3 shows the quick-release hook device 300 in a secured position wherein the hook 310 is securely holding the deck panel 320 in a stored position. In this configuration, a groove 302 in the guide bracket 312 keeps the hook 310 facing the cargo section, while the hook 310 is holding the deck panel 320 in the stored position.

Figure 4:
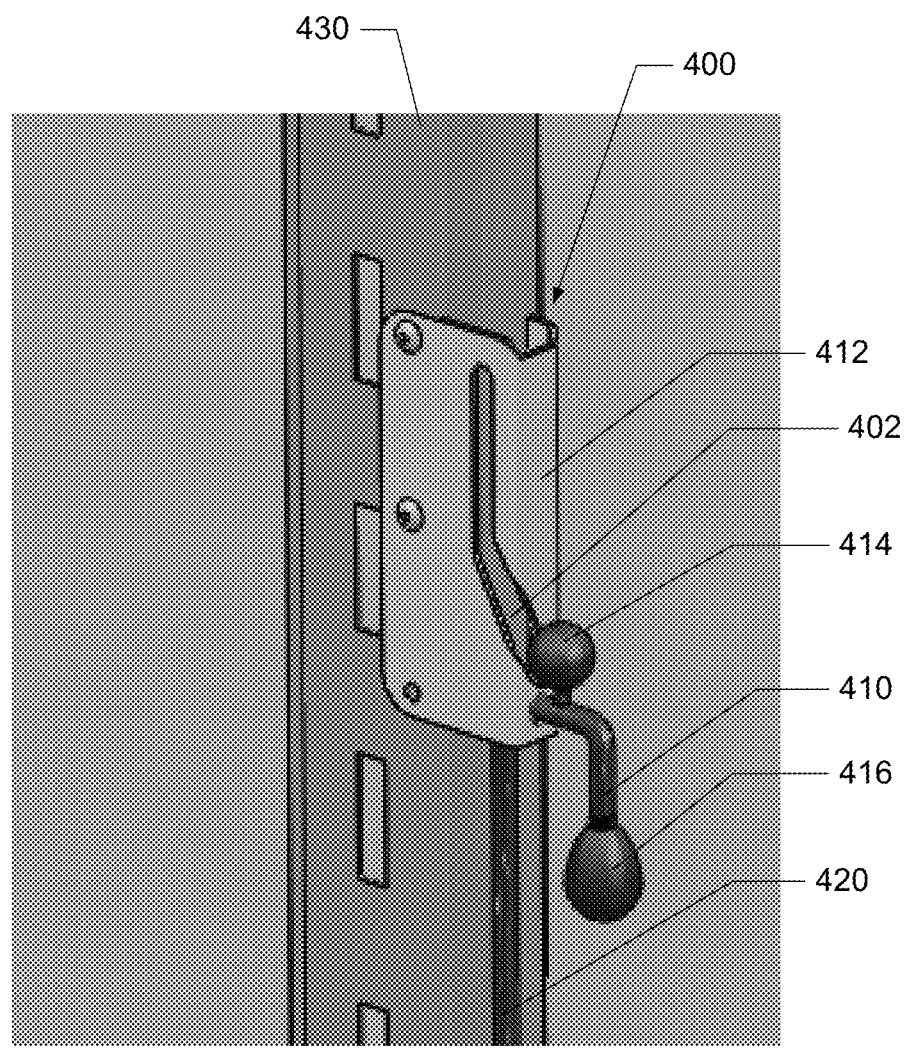
FIG. 4 is a detailed view of the quick-release hook device.

FIG. 4 is a detailed view of the quick-release hook device 400 in accordance with another embodiment of the present disclosure. In the illustrated embodiment of FIG. 4, the quick-release hook device 400 is attached to the vertical post 430 and is configured with a hook 410 movably attached to a guide bracket 412. The configuration of FIG. 4 shows the quick-release hook device 400 in the released position, while the deck panel (not shown) is in the work position. In this configuration, the groove 402 in the guide bracket 412 guides the hook 410 to swing away from the cargo section as the hook 410 is moved from the secured position (shown in FIG. 3) to the released position (shown in FIG. 4). The hook 410 in the released position is facing away from the cargo section, which clears the area in front of the quick-release hook device 400 so that it will not interfere with the transfer of cargo in and out of the cargo section. Further, this avoids potential damage to the cargo or injury to the personnel.

In the illustrated embodiment of FIG. 4, the hook 410 of the quick-release hook device 400 is attached to a long lift-able rod 420. The length and weight of the lift-able rod 420 provides stability and allows the hook 410 to securely lock the deck panel in the stored position and provide the downward pressure needed to move the hook 410 from the secure position to the released position. Further, the slanted or sloped groove 402 in the guide bracket 412 guides the hook 410 to swing away from the cargo section as the hook 410 is moved from the secured position to the released position.

In FIG. 4, a lift handle 414 or 416 can be used to lift the quick-release hook device 400 up so that it can engage and secure onto the deck panel or it can be lifted up to move the quick-release hook device 400 from the secured position to the released position. Thus, the hook 410 turns approximately 90 degrees between the lifting and the lowering of the quick-release hook device 400 (and the deck panel) due to the configuration of the groove 402 in the guide bracket 412.

Figure 5:
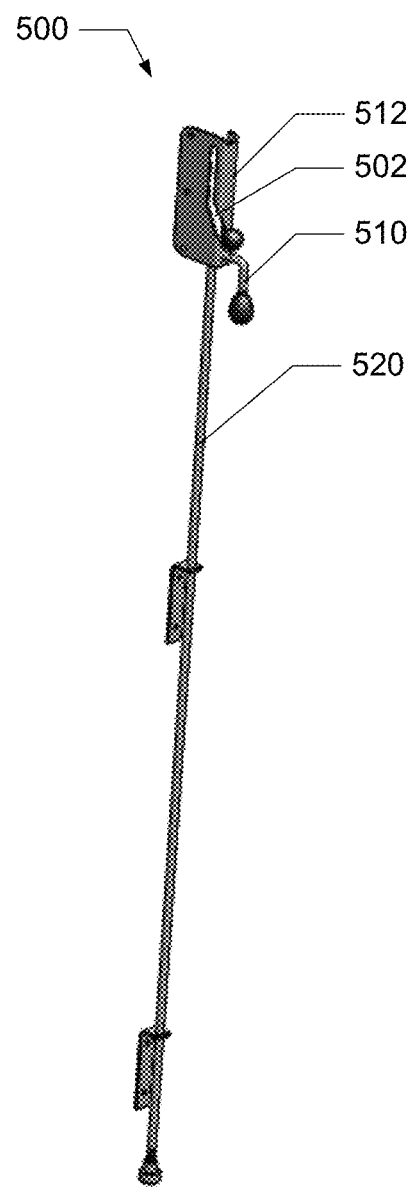
FIG. 5 is a perspective view of the quick-release hook device including the guide bracket, the hook, and the liftable rod.

FIG. 5 is a perspective view of the quick-release hook device 500 including the guide bracket 512, the hook 510, and the lift-able rod 520 in accordance with one embodiment of the present disclosure. FIG. 5 also shows the groove 502 formed on the guide bracket 512.

Figure 6:
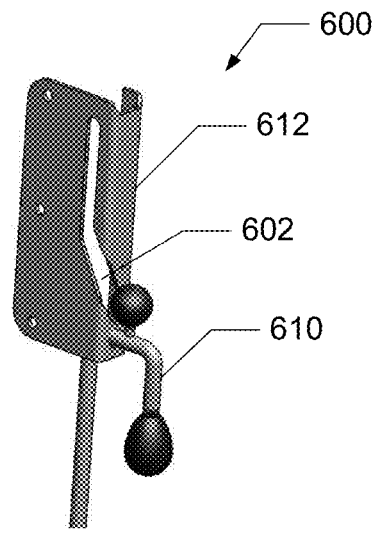
FIG. 6 is a close-up view of the quick-release hook device including the guide bracket and the hook.

FIG. 6 is a close-up view of the quick-release hook device 600 including the guide bracket 612 and the hook 610 in accordance with one embodiment of the present disclosure. The illustrated embodiment of FIG. 6 shows the perpendicular turn made in the groove 602 and the guide bracket 612.

Figure 7:
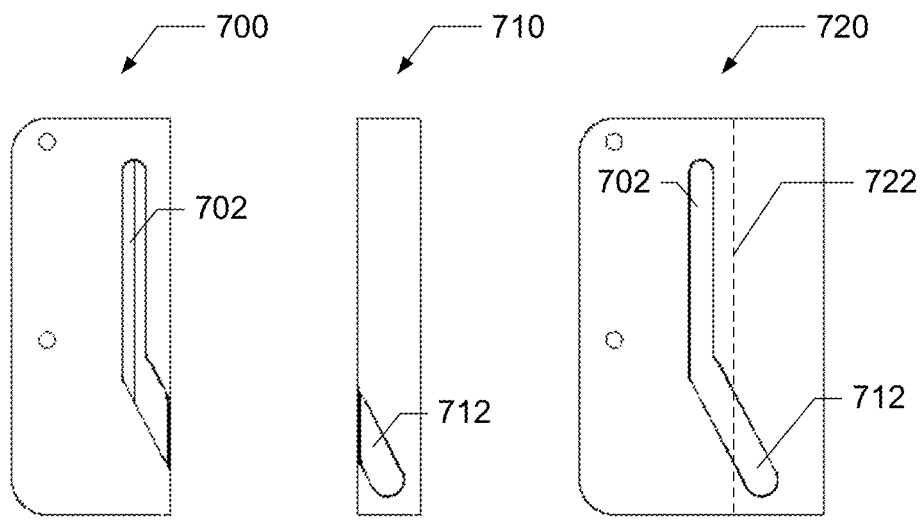
FIG. 7 shows a front view, a side view, and an unfolded view of the guide bracket.

FIG. 7 shows a front view 700, a side view 710, and an unfolded view 720 of the guide bracket in accordance with one embodiment of the present disclosure. When the hook (not shown in this figure) is in the front groove 702, the hook faces the cargo section. However, as the groove 702 turns and the hook moves into the side groove 712, the groove 702, 712 guides the hook to swing away from the cargo section and to stow the hook to the side of the guide bracket. The unfolded view 720 shows that the front groove 702 stays vertical and then changes its direction in a slanted or sloped angle to guide the hook through the approximately 90-degree turn into the side groove 712. The turn is made from left to right at the dotted line 722 where the guide bracket is folded perpendicularly so that the hook in the groove turns to the right.

Figure 8:
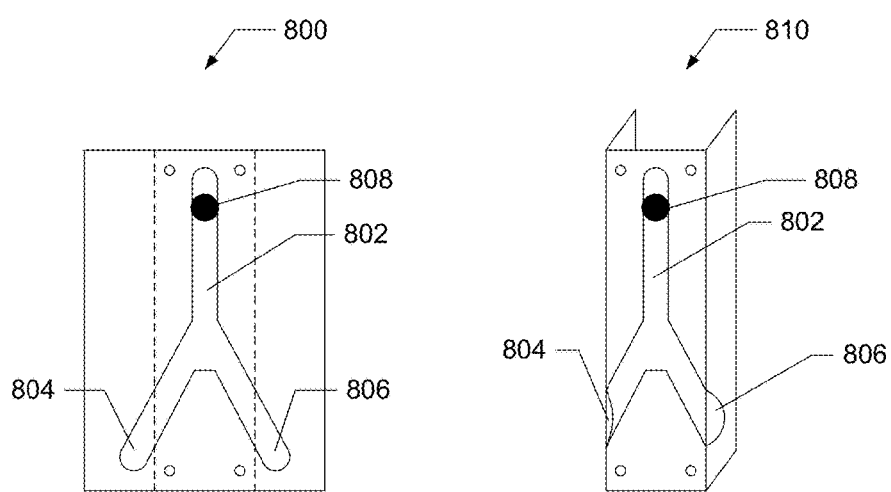
FIG. 8 is an unfolded view 800 and a front perspective view 810 of the guide bracket in accordance with an alternative embodiment of the present disclosure.

FIG. 8 is an unfolded view 800 and a front perspective view 810 of the guide bracket in accordance with an alternative embodiment of the present disclosure. In the illustrated embodiment of FIG. 8, the guide bracket is configured with a vertical groove 802 that splits into two slanted grooves 804, 806 so that the hook 808 can be moved to either groove 804 or 806 to stow away the hook 808 to the left or right side. The decision whether to move the hook 808 to the left or the right can depend on which side of the bracket has obstructions.

The descriptions of the disclosed embodiments are provided to enable any person skilled in the art to make or use the disclosure. Various modifications to these embodiments will be readily apparent to those skilled in the art, and the generic principles described herein can be applied to other embodiments without departing from the spirit or scope of the disclosure. For example, although the illustrated embodiments of the present disclosure show the long lift-able rod attached to the hook, the rod can be of different shape, size, or eliminated entirely. In another example, although the illustrated embodiments of the present disclosure show a guide bracket as having a groove that can turn the hook in a perpendicular direction, elements other than a bracket can be used to move the hook. For example, a gear box shaped element can be used in place of the bracket to guide the hook. Thus, it is to be understood that the description presented herein represent embodiments representative of the subject matter which is broadly contemplated by the present disclosure.

Additional variations and embodiments are also possible. Accordingly, the technology is not limited only to the specific examples noted herein.

The invention claimed is:

1. A hook device for securing or releasing a deck panel used in a cargo section of a trailer, the hook device comprising:
   a guide bracket configured with at least first and second sides, the guide bracket including a groove formed on the first side and extending to the second side; and
   a hook configured to operate within the groove to secure or release the deck panel, the hook configured to secure the deck panel in a stored position when the hook is on the first side of the guide bracket and to release the deck panel in a work position when the hook is on the second side of the guide bracket,
   wherein the groove forms an opening bounded entirely by the at least first and second sides so that the hook moves only within the groove.

2. The hook device of claim 1, wherein the first and second sides of the guide bracket are substantially perpendicular to each other.

3. The hook device of claim 1, further comprising
   at least one handle coupled to the hook, the at least one handle configured to be used to lift the hook to secure or release the deck panel.

4. The hook device of claim 3, wherein the hook and the at least one handle is configured to swing away from the cargo section of the trailer when the hook moves from the first side to the second side of the guide bracket.

5. The hook device of claim 1, wherein the hook is in a secured position when the hook is on the first side of the guide bracket to secure the deck panel in a stored position, and
   wherein the hook is in a released position when the hook is on the second side of the guide bracket and the deck panel is in the work position.

6. The hook device of claim 5, further comprising
   a lift-able rod coupled to the hook, the lift-able rod configured to securely lock the deck panel in the stored position and provide a downward pressure needed to move the hook from the secured position to the released position.

7. An apparatus for a cargo section of a trailer, the apparatus comprising:
   a bracket coupled to a sidewall of the cargo section, the bracket configured with a plurality of sides;
   a groove formed on a first side of the plurality of sides and extending into a second side adjacent to the first side; and
   a hook disposed within the groove, the hook configured to secure a deck panel when the hook is on the first side of the bracket and to release the deck panel when the hook is on the second side of the bracket,
   wherein the groove forms an opening bounded entirely by the plurality of sides so that the hook moves only within the groove.

8. The apparatus of claim 7, wherein the first and second sides of the bracket are substantially perpendicular to each other.

9. The apparatus of claim 7, further comprising
   at least one handle coupled to the hook, the at least one handle configured to be used to lift the hook to secure or release the deck panel.

10. The apparatus of claim 9, wherein the hook and the at least one handle is configured to swing away from the cargo section of the trailer when the hook moves from the first side to the second side of the bracket.

11. The apparatus of claim 7, further comprising
    a lift-able rod coupled to the hook, the lift-able rod configured to securely lock the deck panel and provide a downward pressure needed to move the hook from the secured position to the released position.

12. An apparatus, the apparatus comprising:
    means for securing and releasing a deck panel into and from a stored position on a sidewall of a cargo section of a trailer; and
    means for guiding having a first side and a second side, wherein the means for guiding guides the means for securing,
    wherein the means for guiding forms an opening bounded entirely by the first and second sides so that the means for securing moves only within the opening.

13. The apparatus of claim 12, wherein the first and second sides of the means for securing are substantially perpendicular to each other.

14. The apparatus of claim 12, further comprising
    means for lifting coupled to the means for securing, the means for lifting configured to be used to lift the means for securing to secure or release the deck panel.

15. The apparatus of claim 14, wherein the means for lifting is configured to swing away from the cargo section of the trailer when the means for lifting moves from the first side to the second side of the means for securing.

16. The apparatus of claim 12, wherein the means for securing is in a secured position when the means for securing is on the first side, and is in a released position when the means for securing is on the second side.

17. The apparatus of claim 16, further comprising
    means for providing stability coupled to the means for securing, the means for providing configured to securely lock the deck panel in the stored position and provide a downward pressure needed to move the means for securing from the secured position to the released position.

* * * * *